United States Patent
Bramley, Jr. et al.

(10) Patent No.: US 11,989,576 B2
(45) Date of Patent: May 21, 2024

(54) EXECUTION OF CODE IN SYSTEM MEMORY

(71) Applicant: Hewlett-Packard Development Company, L.P., Spring, TX (US)

(72) Inventors: Richard Alden Bramley, Jr., Mansfield, MA (US); Dallas M. Barlow, Tomball, TX (US); Jeffrey Kevin Jeansonne, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 417 days.

(21) Appl. No.: 17/411,045

(22) Filed: Aug. 24, 2021

(65) Prior Publication Data
US 2023/0066447 A1    Mar. 2, 2023

(51) Int. Cl.
*G06F 9/455*    (2018.01)
(52) U.S. Cl.
CPC .......... *G06F 9/45558* (2013.01); *G06F 9/455* (2013.01); *G06F 9/45533* (2013.01); *G06F 2009/45579* (2013.01); *G06F 2009/45583* (2013.01); *G06F 2009/45587* (2013.01)
(58) Field of Classification Search
CPC .. G06F 9/455; G06F 9/45533; G06F 9/45558; G06F 2009/45579; G06F 2009/45583; G06F 2009/45587; G06F 9/4418
See application file for complete search history.

(56) References Cited

U.S. PATENT DOCUMENTS

| | | | |
|---|---|---|---|
| 7,421,689 B2 | 9/2008 | Ross | |
| 7,610,426 B1 | 10/2009 | Dunn | |
| 8,473,945 B2 | 6/2013 | Datta | |
| 9,594,927 B2 * | 3/2017 | Zimmer | H04L 9/14 |
| 10,108,800 B1 | 10/2018 | Surdu | |
| 2005/0076186 A1 | 4/2005 | Traut | |
| 2005/0091652 A1 * | 4/2005 | Ross | G06F 9/45533 718/1 |
| 2011/0072428 A1 * | 3/2011 | Day, II | G06F 9/45558 718/1 |
| 2017/0090963 A1 * | 3/2017 | Nakajima | G06F 9/45558 |
| 2017/0168902 A1 * | 6/2017 | Branco | G06F 21/554 |
| 2018/0357093 A1 * | 12/2018 | Cong | G06F 12/109 |
| 2021/0192050 A1 * | 6/2021 | Hird | G06F 21/606 |

OTHER PUBLICATIONS

Pan et al, "Improving Virtualization Security by Splitting Hypervisor into Smaller Components", IFIP International Federation for Information Processing 2012, DBSec 2012, LNCS 7371, pp. 298-313, 2012 (Year: 2012).*

* cited by examiner

*Primary Examiner* — Charles M Swift
(74) *Attorney, Agent, or Firm* — Knobbe, Martens, Olson & Bear, LLP

(57) ABSTRACT

In some examples, a computing device includes memory including system memory, and a processor in electronic communication with the memory. In some examples, the processor receives a system management interrupt. In some examples, the processor identifies trigger code that triggered the system management interrupt. In some examples, the processor executes code from the system memory when the trigger code is a virtualization program.

14 Claims, 4 Drawing Sheets

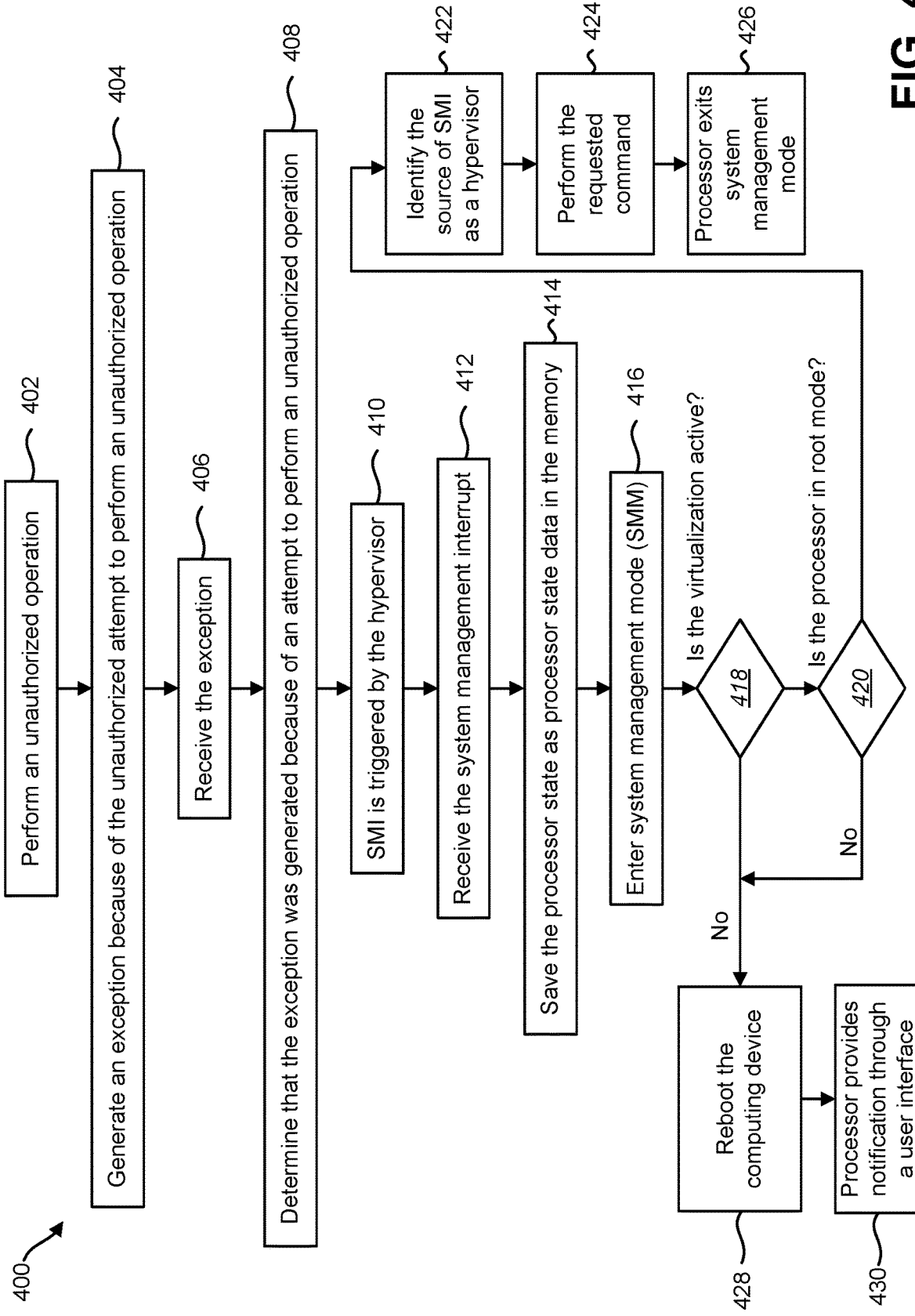

EXECUTION OF CODE IN SYSTEM MEMORY

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

BRIEF DESCRIPTION OF THE DRAWINGS

FIG. 4 is a flow diagram illustrating an example of a method to authorize the execution of code in system memory.

DETAILED DESCRIPTION

Figure 1:
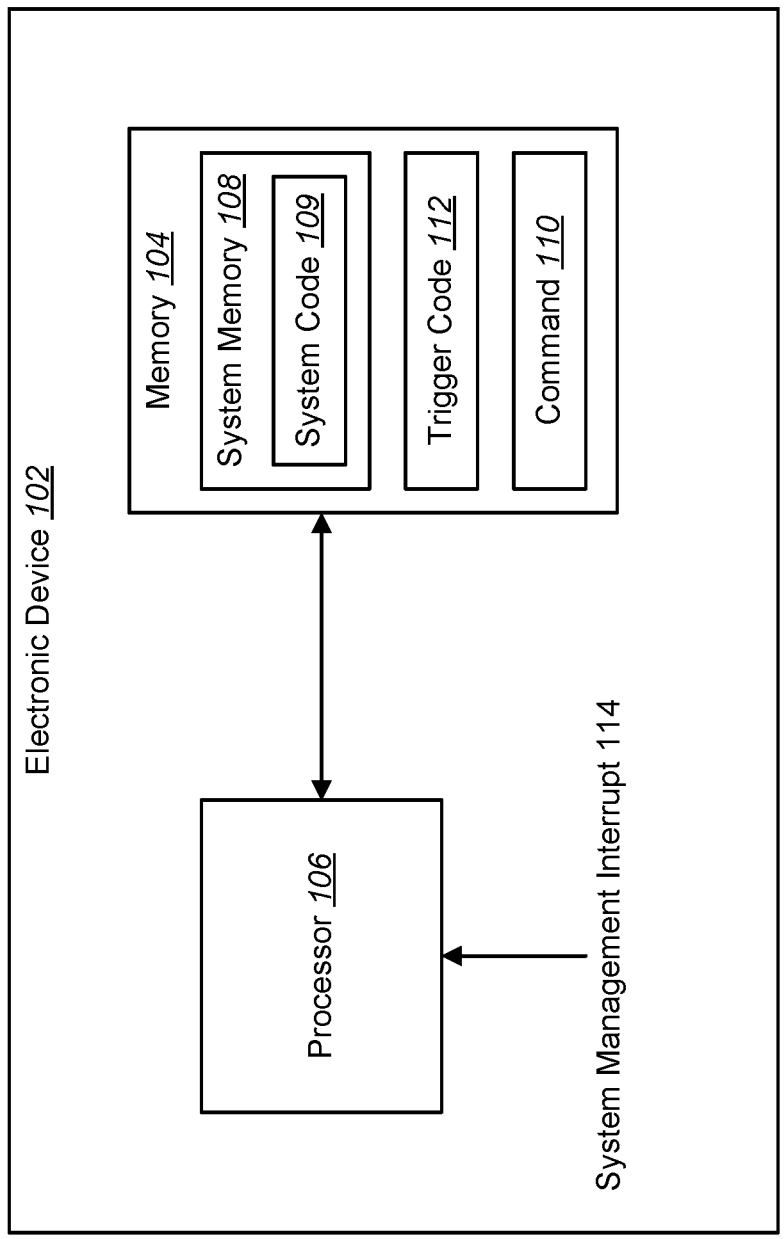
FIG. 1 is a block diagram illustrating an example of an electronic device that may be used to authorize the execution of code in system memory.

Some examples of the techniques described herein may be related to authorizing commands on electronic hardware devices. An electronic device may be a device that includes electronic circuitry (e.g., integrated circuitry). Examples of electronic devices may include computing devices (e.g., laptop computers, desktop computers, tablet devices, etc.), smartphones, game consoles, etc. In some examples, electronic devices may utilize circuitry (e.g., controller(s), processor(s), etc., or a combination thereof) to perform an operation. In some examples, electronic devices may execute instructions stored in memory to perform the operation(s). Instructions may be code, programming, or a combination thereof that specifies functionality or operation of the circuitry. In some examples, instructions may be stored in non-volatile memory (e.g., Read-Only Memory (ROM), Erasable Programmable Read-Only Memory (EPROM), Electrically Erasable Programmable Read-Only Memory (EEPROM), flash memory, Random-Access Memory (RAM), Non-Volatile Random-Access Memory (NVRAM), etc.). In some examples, different circuitries in an electronic device may store or utilize separate instructions for operation.

In some examples, virtualization may create a virtual machine (VM) where the different devices, firmware and memory areas are created by the virtualization solution (e.g., virtualbox) and emulated to enable a guest operating system (OS) to be booted. Occasionally a real device (e.g., graphics) may be passed through to the guest OS to enable better performance or advanced capabilities, but in these cases the device being passed through may be owned by the guest OS.

In some examples, certain solutions, rather than create a virtual machine, use the virtualization capabilities of the central processing unit (CPU) or processor to enable security capabilities to protect code and devices against tampering while still allowing access to many of the computing device's capabilities. In these solutions, virtualization code may be invoked, set up page tables, input/output (I/O) protections, etc., and may then return to continue executing the existing code flow. If malicious code attempts to perform an unauthorized operation, such as writing over code in memory, the virtualization code may get an exception and may be able to take appropriate action (e.g., alerting the user, rebooting, etc.). If nothing malicious happens, the computing device may continue to operate normally.

In some examples, computing devices have a special mode called system management mode (SMM), which is the most privileged mode on the computing device. This mode may be triggered by a system management interrupt (SMI) that may occur as the result of a hardware signal or via a software write to a specific I/O port (i.e., a Software SMI (SWSMI)). A software write is when instructions in memory, when executed by a processor, cause data to be sent to a specific I/O port. When a software write is performed, the execution of the instructions by the processor cause a specific address to be loaded so that data then sent out over the data bus is sent or provided to that specific address. When in SMM, the processor may execute code that is in system management RAM (SM RAM), a region of memory that is not accessible at runtime unless the processor is in SMM. The code and data in SMRAM may be set up by the BIOS (defined below) early in the boot process and because of its unique privileged mode is often used to perform security sensitive operations. One example of a security sensitive operation may be writing to flash storage. Another example of a security sensitive operation is securely logging events detected by virtualization code.

The techniques described herein may provide a mechanism to enable the request of a security sensitive operation from virtualization code but block that same request if the request came from the existing code flow. The techniques described herein may also provide a method by which SWSMIs may be used by any code during the boot process for various purposes but when a request is made to perform a security sensitive operation, the SMM code may allow the security sensitive operation to be performed if the SWSMI was triggered from the virtualization code.

In some examples, code may have knowledge of a secret or a key so that the code may identify itself as code allowed to make a certain call. For example, some code may perform tasks that are exclusively performed by privileged programs or privileged code. Determination of privilege may be accomplished by providing the privileged code or entity a secret like a password or private key. In these examples, there may be a temporal component where the call with the secret has been made and then additional calls for the remainder of the boot are allowed. In some of these cases, there may be a random secret generated on every boot that may be transferred to the virtualization code during its initial invocation. The techniques described herein may allow sensitive operations to be performed without the code that triggered the SWSMI to know a secret or a key.

Throughout the drawings, similar reference numbers may designate similar or identical elements. When an element is referred to without a reference number, this may refer to the element generally, with or without limitation to any particular drawing or figure. In some examples, the drawings are not to scale, and the size of some parts may be exaggerated to more clearly illustrate the example shown. Moreover, the drawings provide examples in accordance with the description. The description is not limited to the examples provided in the drawings.

FIG. 1 is a block diagram illustrating an example of an electronic device 102 that may be used to authorize commands 110 that use system code 109 in system memory 108.

The electronic device 102 may include or may be coupled to a processor 106 in communication with memory 104. The memory 104 may include system memory 108 that is only accessible after the processor 106 receives a system management interrupt 114. The system memory 108 is not accessible by computer programs or code unless the processor is in a system management mode, which is triggered by the system management interrupt 114. Because the system memory 108 is not accessible outside of system management mode, the system memory 108 is used to store sensitive and secure code, such as the system code 109. When the electronic device 102 enters system management mode, the state of the processor is saved to the system memory 108 so that the state can be restored to the processor when exiting system management mode. One example of system memory 108 is System Management RAM (SM-RAM). The system memory 108 may include system code 109. The system code 109 may be a security sensitive operation. The memory 104 may also include trigger code 112. The trigger code 112 may be the code that caused the system management interrupt (SMI) 114.

In some examples, the processor 106 is to receive the system management interrupt 114, identify the trigger code 112 that triggered the system management interrupt 114, and execute the command 110 that uses system code 109 in the system memory 108 to implement the requested command 110 when the trigger code 112 is a virtualization program. In some examples, the virtualization program is the root of virtualization, which is sometimes referred to as VM ROOT. In such examples, the processor may execute the command 110 when the command 110 was triggered from a virtualization program running as VM ROOT.

Virtualization is technology that adds a layer of management between the hardware and the software on a computing device. Virtualization technology allows this layer to block access to resources in the system (e.g., processors, memory, other hardware devices, etc.) as well as create software devices (e.g., a virtual network card). The computer program or code that accomplishes this management is called a hypervisor. When the hypervisor loads the hypervisor configures the virtualization hardware so that the hypervisor receives a callback when events occur as well as when specific parameters of the environment are set, or when other computer programs or code will run, such as part of a virtual machine. The hypervisor runs with higher privileges (i.e., VM ROOT) than what is run in the virtual machines (i.e., non-VM ROOT) so that the hypervisor may limit what the virtual machines have access to.

Examples of the electronic device 102 may include a computing device (e.g., laptop computer, desktop computer, tablet computer), a smartphone, a portable game console, etc. In some examples, portions of the electronic device 102 may be coupled via an interface (e.g., bus(es), wire(s), connector(s), etc.). For example, portions of the electronic device 102 or circuitries of the electronic device 102 may be coupled via an inter-integrated circuit (I2C) interface. The portions or circuitries may communicate via the interface.

In some examples, the memory 104 may include memory circuitry. The memory circuitry may be electronic, magnetic, optical, or other physical storage device(s) that contains or stores electronic information (e.g., instructions, data, or a combination thereof). In some examples, the memory circuitry may store instructions for execution (by the processor 106, or other component(s) of the electronic device 102, or a combination thereof). The memory circuitry may be integrated into or separate from the element(s) described in FIG. 1. The memory circuitry may be, for example, Random Access Memory (RAM), Electrically Erasable Programmable Read-Only Memory (EEPROM), storage device(s), optical disc(s), or the like. In some examples, the memory circuitry may be volatile memory, non-volatile memory, or a combination thereof. Examples of memory circuitry may include Dynamic Random Access Memory (DRAM), EEPROM, magnetoresistive random-access memory (MRAM), phase change RAM (PCRAM), memristor, flash memory, or the like. In some examples, the memory circuitry may be non-transitory tangible machine-readable or computer-readable storage media, where the term "non-transitory" does not encompass transitory propagating signals.

The processor 106 may be a processor to perform an operation on the electronic device 102. Examples of the processor 106 may include a general-purpose processor, an application-specific integrated circuit, a microprocessor, etc. In some examples, the processor 106 may be an application processor. The processor 106 may execute instructions (e.g., an application) on the electronic device 102.

As used herein, firmware may be instructions stored on a hardware device or electronic circuitry to operate the hardware device or electronic circuitry. Instructions included in firmware may be code or programming that defines or controls functionality or operation of the hardware device or electronic circuitry. For example, some hardware devices or electronic circuitries may execute firmware to perform an operation(s). For instance, firmware may be executed to initialize, control, and/or operate the hardware device or electronic circuitry. In some examples, firmware may include instructions to control communication and/or interaction between the hardware device or electronic circuitry and other hardware or circuitry(ies) (e.g., a host electronic device). In some examples, firmware may be stored in non-volatile memory (e.g., Read-Only Memory (ROM), Erasable Programmable Read-Only Memory (EPROM), Electrically Erasable Programmable Read-Only Memory (EEPROM), flash memory, etc.). In some examples, different circuitries in an electronic device may store and/or utilize separate firmware for operation.

The electronic device 102 may include additional portions (e.g., components, circuitries, etc.) (not shown) or some of the portions described herein may be removed or modified without departing from the scope of this disclosure. In some examples, the electronic device 102 may include input/output (I/O) circuitry (e.g., port(s), interface circuitry, etc.), memory circuitry, input device(s), output device(s), etc., or a combination thereof.

Figure 2:
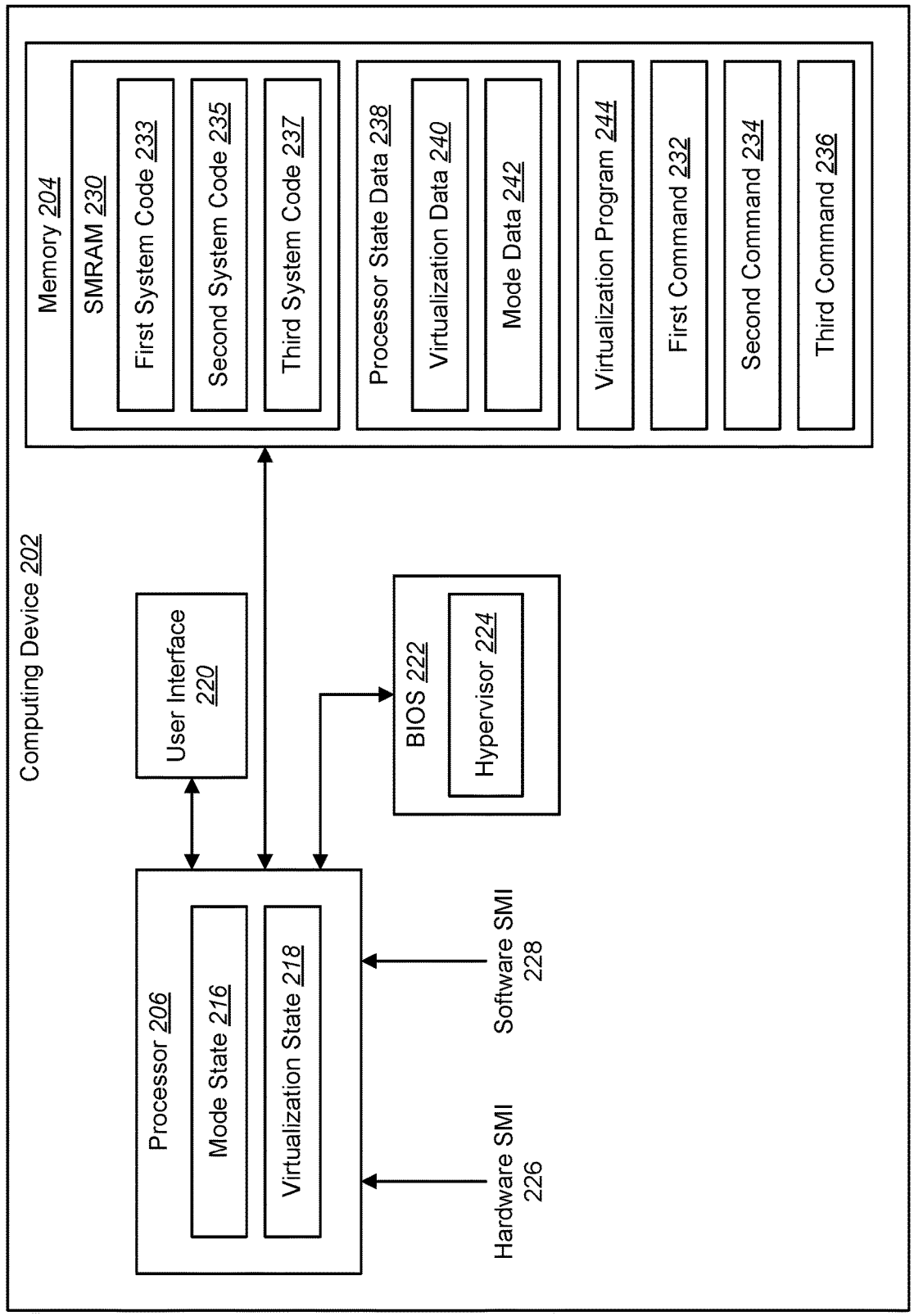
FIG. 2 is a block diagram illustrating an example of a computing device that may be used to authorize the execution of code in system memory.

FIG. 2 is a block diagram illustrating an example of a computing device 202 that provides authorization for code in system memory to be executed. In some examples, the computing device 202 may perform an aspect of the operations described in FIG. 1. The computing device 202 may be an example of the electronic device 102 described in FIG. 1. In some examples, the computing device 202 may include or may be coupled to a processor 206 in communication with memory 204, a user interface 220, and a BIOS 222. In some examples, portions of the computing device 202 may be coupled via an interface (e.g., bus(es), wire(s), connector(s), etc.). For example, portions of the computing device 202 or circuitries of the computing device 202 may be coupled via an inter-integrated circuit (I2C) interface. The portions or circuitries may communicate via the interface. Examples of the computing device 202 include a desktop computer, smartphone, laptop computer, tablet device, mobile device, etc. In some examples, one, some, or all of the components or elements of the computing device 202 may be structured in hardware or circuitry. In some examples, the computing device 202 may perform one, some, or all of the operations described in FIGS. 1-4.

The processor 206 may execute instructions on the computing device 202 to perform an operation (e.g., execute application(s)). For instance, the processor 206 may be an example of the processor 106 described in FIG. 1. In other examples, the processor 206 may be a processor from the AMD architecture or a processor from the Intel architecture. The processor 206 may be in electronic communication with the memory 204 via a memory communications bus.

The memory 204 may include system management random access memory (SMRAM) 230. The SMRAM 230 is a region of memory 204 that is not accessible at runtime unless the processor 206 is in SMM. The code and data in SMRAM 230 may be set up by the BIOS 222 (defined below) early in the boot process and because of its unique privileged mode the code and data in SMRAM 230 is often used to perform security sensitive operations. The first system code 233, second system code 235, and third system code 237 in the SMRAM 230 are examples of security sensitive code or operations. The first command 232, second command 234, and third command 236 are examples of instructions or programs that use the first system code 233, second system code 235, or third system code 237, or a combination thereof, for security sensitive operations. Some examples of security sensitive operations include writing to flash storage, writing to a portion of memory 204 marked as read-only, securely logging detected events, disabling a sensitive feature, decrypting sensitive data, requesting access to a sensitive resource, etc. The first command 232, second command 234, and third command 236 may be stored outside of the SMRAM 230.

In some examples, the memory 204 may store processor state data 238. When the processor 206 receives an SMI, the processor 206 may save its state in the processor state data 238. In other words, when the processor 206 enters system management mode (SMM), the processor 206 may save its state in the processor state data 238. The processor state data 238 may include the data from registers of the processor 206, internal states of the processor 206, etc. The processor state data 238 stores the data to enable a complete restore of the state of the processor after the SMM. The processor state data 238 may include virtualization data 240 that includes the state information about whether virtualization was active or not active on the processor 206 at the time of the SMI. The processor state data 238 may also include mode data 242 that includes the mode information about what mode the processor 206 was in at the time of the SMI. For example, the mode data 242 may include information about whether the processor 206 was in virtual machine extensions (VMX) root mode or VMX non-root mode. VMX provides two modes of execution: VMX root mode and VMX non-root mode. When in VMX root mode, code being executed has broad control of the electronic device's hardware resources. VMX root mode is the execution mode for hypervisor use. The VMX non-root mode limits access to the electronic device's hardware resources and is the execution mode for guests. VMX root mode has higher privileges to the electronic device's hardware resources than VMX non-root mode. VMX root mode may be generally referred to as root mode, and VMX non-root mode may be generally referred to as non-root mode.

The memory 204 may store other processor's state data depending on how many processors are in the computing device 202. For example, the memory 204 may store a copy of the save state for each processor thread in order to restore the state of all of the processor threads. The processor state data 238 may be stored in the memory 204, and may also be stored in an SM RAM 230 save state area.

The memory 204 may include a virtualization program 244. The virtualization program 244 may initially be stored in the BIOS 222 and may then be loaded into the memory 204 in the boot process. After the virtualization program 244 is loaded into the memory 204 the virtualization program 244 may be executed from the memory 204. The virtualization program 244 includes code executable by the processor 206 to set up page tables, and I/O protections. If malicious code attempts to communicate I//O to a protected device or an otherwise unauthorized operation, such as writing over code in memory 204, the virtualization program 244 may get an exception and may be able to take appropriate action (e.g., rebooting, ignoring or blocking the operation, alerting the user, etc.).

The computing device 202 may include a BIOS 222. As used herein, a basic input/output system (BIOS) 222 refers to hardware or hardware and instructions to initialize, control, or operate a computing device 202 prior to execution of an operating system (OS) of the computing device 202. Instructions included within a BIOS 222 may be software, firmware, microcode, or other programming that defines or controls functionality or operation of a BIOS 222. In one example, a BIOS 222 may be implemented using instructions, such as platform firmware of a computing device 202, executable by a processor. A BIOS 222 may operate or execute prior to the execution of the OS of a computing device 202. A BIOS 222 may initialize, control, or operate components such as hardware components of a computing device 202 and may load or boot the OS of computing device 202.

In some examples, a BIOS 222 may provide or establish an interface between hardware devices or platform firmware of the computing device 202 and an OS of the computing device 202, via which the OS of the computing device 202 may control or operate hardware devices or platform firmware of the computing device 202. In some examples, a BIOS 222 may implement the Unified Extensible Firmware Interface (UEFI) specification or another specification or standard for initializing, controlling, or operating a computing device 202.

In some examples, the processor 206 may receive a system management interrupt (SMI) 114 in the form of a hardware SMI 226 (e.g., a hardware signal) or via a software SMI 228 (e.g., a software write to a specific I/O port).

The processor 206 may operate or execute a hypervisor 224. A hypervisor 224, which may also be called a virtual machine monitor or VMM, may be implemented as a computer program that may create and run virtual machines (VMs). A hypervisor 224 may allow the computing device 202 to support multiple guest VMs by virtually sharing its resources, such as memory and processor(s). Hypervisors 224 may support the creation and management of VMs by abstracting the computing device's 202 code from its hardware. Hypervisors 224 may provide virtualization by translating requests between the physical and virtual resources. Hypervisors 224 may be embedded into computing device's 202 firmware at the same level as the motherboard BIOS and may enable the operating system on a computing device 202 to access and use virtualization software. The hypervisor 224 is the code that handles or manages the faults and exceptions when you are in virtualization mode.

The processor 206 may include a virtualization state 218 that indicates whether virtualization is active or not active on the processor 206. The processor 206 may also include a mode state 216 that indicates what mode the processor 206 is in. For example, the mode state 216 may indicate whether the processor 206 is in VMX root mode or VMX non-root mode.

The computing device 202 may include a user interface 220. A user interface 220 may include output devices. Examples of output devices include a display device, speaker(s), headphone(s), etc. The user interface 220 may also include input devices. Examples of input devices include a keyboard, a mouse, a touch screen, camera, microphone, etc. In some examples, a notification may be provided to a user through the user interface 220.

In some examples, the processor 206 is to enter system management mode after receiving an SMI. The command to be executed may have been passed to the processor when the SMI was triggered. The processor 206 may save its state to memory 204 when the system management interrupt 114 occurs. The processor 206 may then determine whether virtualization is active and determine whether the processor 206 is in root mode. In determining whether the processor 206 is in root mode, the processor may identify what VMX mode was active when the SMI was triggered based on the saved processor state. The processor 206 may then execute a command that uses code from the SMRAM 230 when virtualization is active and when the processor 206 is in root mode.

In some examples, for a processor with an Intel® architecture to determine whether virtualization is active, the processor 206 may read a virtual machine execution control field from the memory 204, such as the value of the "EPTP VM-execution control field" state from the virtualization data 240. In some examples this field may be located at the memory address of SMBASE+8000H+7ED8H, which may be simplified to SMBASE+FED8H. When entering SMM, the processor 206 may look for the first instruction at the address SMBASE, which is the SMBASE register content. Once the value of "EPTP VM-execution control field" has been read, the processor 206 may mask off any bits above the number of physical address bits supported by the processor 206. In some examples, if the resulting value is not zero (0) then virtualization is active.

In some examples, for a processor with an AMD® architecture, to determine whether virtualization is active the processor 206 may read an extended feature enable register (EFER) value from the memory 204, such as the value of the "EFER" state from the virtualization data 240. In some examples this field may be located at the memory address of SMBASE+FED0H. If the thirteenth bit is equal to 1, then the processor 206 had virtualization active.

In some examples, for a processor with an Intel® architecture, to determine whether the processor 206 is in root mode the processor 206 may read a virtual machine execution control field from the memory 204, such as bit zero of the setting of "enable EPT" (enable page tables) VM-execution control state from the virtualization data 240. In some examples this field may be located at the memory address of SMBASE+8000H+7EE0H, which may be simplified to SMBASE+FEE0H. If bit zero is equal to zero (0), then the processor 206 was in VMX root mode.

In some examples, for a processor with an AMD® architecture to determine whether the processor 206 is in root mode, the processor 206 may read a secure virtual machine value (SVM) from the memory 204, such as the value of the "SVM" state from the virtualization data 240. In some examples this field may be located at the memory address of SMBASE+FED8H. If the first three bits are equal to "000", then the processor 206 was in VMX root mode.

In some examples, if virtualization is active and the call was made in VMX root mode, then the SMI was generated in the highest security level of the virtualization program 244. Then, if the hypervisor 224 is running, the processor 206 allows a command, such as the first command 232, to be executed. The first command 232 calls code from SMRAM 230 to be executed, such as the first system code 233. If any of these checks (verifying that virtualization is active, verifying that the processor 206 was in root mode, verifying that the hypervisor 224 is running) fail, then the processor 206 may not allow execution of the command that used or called code from SMRAM 230. In addition, the processor 206 may also cause the computing device 202 to reboot. The processor 206 may provide a notification to a user through the user interface 220 that malicious code attempted to perform a security sensitive operation from SM RAM 230.

The processor 206 may determine if a hypervisor 224 was running when entering SMM based on the saved processor state. The root hypervisor 224 may be the hypervisor 224 as referred to herein.

In some examples, an exception to the hypervisor 224 may cause the hypervisor 224 to trigger the SMI. For example, if the first command 232 in the memory 204 attempts to perform an unauthorized action using one of the system codes, such as writing to an area in memory 204 that the first command 232 may not be able to write to, then that unauthorized action may cause the processor 206 to trigger an exception into the hypervisor 224. The hypervisor 224 may get the exception, determine that the exception was an unauthorized action attempted by the first command 232, and may then trigger the SMI itself.

Figure 3:
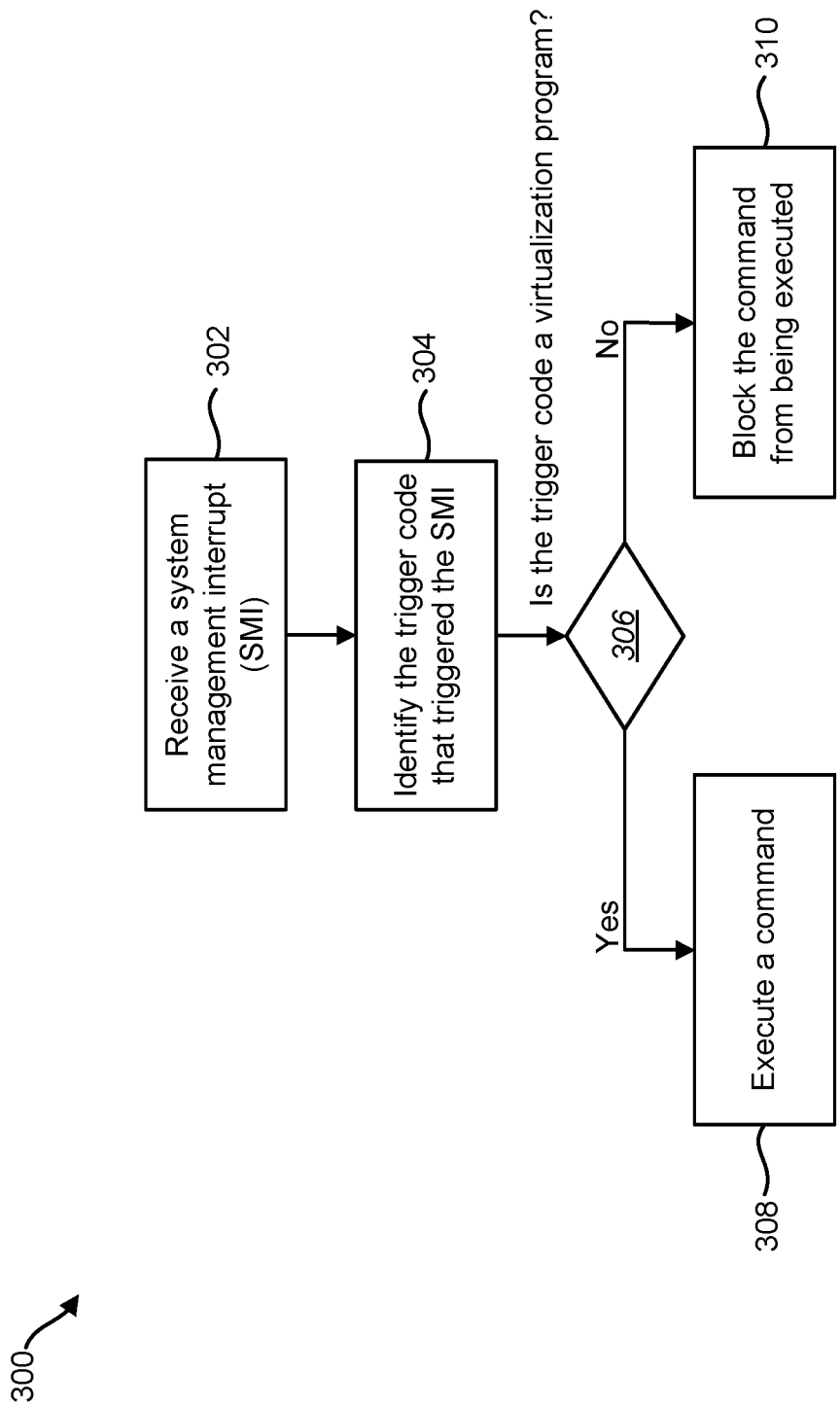
FIG. 3 is a flow diagram illustrating an example of a method to authorize the execution of code in system memory.

FIG. 3 is a flow diagram illustrating an example of a method 300 for authorization for commands that use code in system memory. The method 300 or a method 300 element(s) may be performed by an electronic device or apparatus (e.g., electronic device 102, apparatus, desktop computer, laptop computer, smartphone, tablet device, etc.). For example, the method 300 may be performed by the electronic device 102 described in FIG. 1 or by the computing device 202 described in FIG. 2. The method may be performed during a power-on self-test (POST), during a boot process of the computing device before the operating system is loaded, or during runtime after the operating system has been loaded.

At 302, a computing device may receive a system management interrupt (SMI). The SMI may be a hardware SMI or a software SMI. At 304, the computing device may identify the trigger code that triggered the SMI. At 306, the computing device may determine whether the trigger code is a virtualization program. In one example, the device may determine whether the trigger code is a virtualization program by identifying an active virtual machine extensions (VMX) mode based on the saved processor state as either VMX root mode or VMX non root mode. If the trigger code is a virtualization program, a command that uses code from SMRAM to implement the command may be executed 308. If the trigger code is not the virtualization program, the computing device may block 310 the command from being executed. The computing device may block 310 the command from being executed by ignoring the command.

FIG. 4 is a flow diagram illustrating an example of a method 400 for authorization for commands that use code in system memory. The method 400 or a method 400 element(s) may be performed by an electronic device, computing device or apparatus (e.g., electronic device 102, apparatus, desktop computer, laptop computer, smartphone, tablet device, etc.). For example, the method 400 may be performed by the electronic device 102 described in FIG. 1 or by the computing device 202 described in FIG. 2.

At 402, unauthorized code attempts to perform an unauthorized operation. For example, if the first command 232 from the memory 204 attempts to write to a part of the memory 204 that included code and had been marked as read only.

At 404, an exception is generated because of the unauthorized attempt to perform an unauthorized operation. One example of an exception being generated is when code attempts to overwrite other code. A hypervisor may load and find the address of all the BIOS code modules loaded into memory. The hypervisor is programmed that no code is to overwrite this code. The hypervisor may set up a page table that may tell the processor if any code attempts to write to any of these addresses. If any code attempts to write to any of these addresses an exception is generated to the hypervisor. Similarly with I/O ports, the hypervisor may set up the virtualization support so that if a specific I/O port is read/written, an exception to the hypervisor is raised.

At 406, the hypervisor may receive the exception. At 408, the hypervisor may determine that the exception was generated because of an attempt to perform an unauthorized operation.

At 410, an SMI may be triggered by the hypervisor. At 412, the processor may receive the system management interrupt. At 414, the processor may save the processor state as processor state data in the memory. At 416, the processor may enter system management mode (SMM).

At 418, the processor may determine whether virtualization is active, as described above. At 420, the processor may determine whether the processor is in root mode, as described above.

If the processor determined that virtualization was active and that the processor was in root mode, then the source of the SMI is identified as being from a hypervisor, at 422. At 424, the requested command is executed. At 426, the processor exits system management mode.

If the processor determined that virtualization was not active or that the processor was not in root mode, the computing device may be rebooted, at 428. At 430, the processor may provide a notification to a user through the user interface of an attempt to perform an unauthorized command that included calls to security sensitive operations in the SMRAM.

As used herein, items described with the term "or a combination thereof" may mean an item or items. For example, the phrase "A, B, C, or a combination thereof" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operation(s), aspect(s), or element(s) of the examples described herein may be omitted or combined.

What is claimed is:

1. A computing device comprising:
   memory including a system memory that is accessible during a system management mode of the computing device and inaccessible during a runtime mode of the computing device; and
   a processor in electronic communication-with the memory, wherein the processor is to:
   receive a system management interrupt;
   in response to receiving the system management interrupt, enter the system management mode; and
   during the system management mode,
   identify trigger code that triggered the system management interrupt received by the processor; and
   determine whether the trigger code is virtualization code for protecting the computing device from tampering,
   wherein in response to determining that the trigger code is the virtualization code for protecting the computing device from tampering, the processor is to execute a security sensitive command using system code stored in the system memory, and
   wherein in response to determining that the trigger code is not the virtualization code for protecting the computing device from tampering, the processor does not execute the security sensitive command.

2. The computing device of claim 1, wherein the security sensitive command is triggered from a virtualization program running as a root of virtualization (VM ROOT).

3. The computing device of claim 1, wherein the system code stored in the system memory is to cause the processor to execute a command stored outside of the system memory.

4. The computing device of claim 1, wherein the processor further is to block the trigger code from the system memory when the trigger code is not triggered from a virtualization program running as a root of virtualization (VM ROOT).

5. An electronic device comprising:
   memory including a system management random access memory (SMRAM) that is accessible during a system management mode of the electronic device and inaccessible during a runtime mode of the electronic device; and
   a processor in electronic communication with the memory, wherein the processor is to:
   in response to receiving a system management interrupt, enter the system management mode; and
   during the system management mode:
   access mode data stored in the memory, wherein the mode data identifies a mode of the processor at receipt of the system management interrupt, and
   determine whether virtualization is active on the processor,
   wherein in response to determining that the virtualization is not active on the processor, reboot the electronic device;
   wherein in response to determining that the virtualization is active on the processor,
   determine from the mode data that the processor was, at time of the receipt of the system management interrupt, in a root mode for protecting the electronic device from tampering, and
   execute a security sensitive command stored in the SMRAM.

6. The electronic device of claim 5, wherein to determine whether the virtualization is active on the processor, the processor further is to read a virtual machine execution control field from a save state area of the memory.

7. The electronic device of claim 5, wherein to determine whether the virtualization is active on the processor, the processor further is to read an extended feature enable register value from a save state area of the memory.

8. The electronic device of claim 5, wherein to determine that the processor was, at time of receipt of the system management interrupt, in the root mode, the processor further is to read a virtual machine execution control field from a save state area of the memory.

9. The electronic device of claim 5, wherein to determine that the processor was, at time of receipt of the system management interrupt, in the root mode, the processor further is to read a secure virtual machine value from a save state area of the memory.

10. A computing device comprising:
   memory including a system management random access memory (SMRAM) that is accessible during a system management mode of the computing device and inaccessible during a runtime mode of the computing device; and
   a processor in electronic communication with the memory, wherein the processor is to:
   save a state of the processor at receipt of a system management interrupt;
   in response to receiving the system management interrupt, enter the system management mode; and
   during the system management mode:
      determine from the state of the processor at the receipt of the system management interrupt, whether the processor was in a virtual machine extensions (VMX) root mode or VMX non-root mode at time of the receipt of the system management interrupt,
      wherein in response to determining that the processor is in VXM root mode, execute at least one security system code stored in the SMRAM, and
      wherein in response to determining that the processor is in the VMX non-root mode, reboot the computing device.

11. The computing device of claim 10, wherein the processor further is to exit the system management mode when the processor is in the VMX non-root mode.

12. The computing device of claim 10, wherein the processor further is to trigger the system management interrupt based on an exception.

13. The computing device of claim 12, wherein the system management interrupt is triggered by a software system management interrupt, wherein the software system management interrupt comprises a software write to an input/output (I/O) port.

14. The computing device of claim 10, wherein a hypervisor calls a system management mode operation, when the processor is in the VMX root mode.

* * * * *